United States Patent [19]

Nakajima et al.

[11] Patent Number: 5,090,052
[45] Date of Patent: Feb. 18, 1992

[54] TELEPHONE SYSTEM WITH MULTIPLE EXTENSION TELEPHONES

[75] Inventors: Ryuichi Nakajima; Koji Yamana, both of Tokyo, Japan

[73] Assignee: Tandy Corporation, Fort Worth, Tex.

[21] Appl. No.: 683,085

[22] Filed: Apr. 9, 1991

Related U.S. Application Data

[63] Continuation of Ser. No. 353,601, May 18, 1989, abandoned.

[51] Int. Cl.$^5$ ........................................... H04M 11/00
[52] U.S. Cl. ..................................... 379/98; 379/160; 379/159; 379/172; 370/30
[58] Field of Search .................... 379/64, 66, 159, 160, 379/171, 172, 177, 165, 98; 370/30

[56] References Cited

U.S. PATENT DOCUMENTS

| | | | |
|---|---|---|---|
| 2,289,048 | 7/1942 | Sandalls | 379/66 |
| 2,481,915 | 9/1949 | Edson et al. | 379/56 |
| 2,507,116 | 5/1950 | Moore | 379/66 |
| 2,511,617 | 6/1950 | Barstow | 379/66 |
| 2,626,319 | 1/1953 | Cheek et al. | 370/30 |
| 3,809,815 | 5/1974 | Reed et al. | 370/30 |
| 4,523,307 | 6/1985 | Brown | 370/30 |
| 4,734,932 | 3/1988 | Lott | 379/160 |
| 4,769,837 | 9/1988 | McCormick et al. | 379/160 |

FOREIGN PATENT DOCUMENTS 8911186  11/1989  PCT Int'l Appl.

OTHER PUBLICATIONS

Int'l Pub. No.: WO 89/11186, Nov. 16, 1989, Effective Filing Date: May 12, 1988, Heep et al.

Primary Examiner—James L. Dwyer
Assistant Examiner—Stella L. Woo
Attorney, Agent, or Firm—Townsend and Townsend

[57] ABSTRACT

An improved telephone system in which a plurality of telephone units connected to a common telephone line is directly connected to an outside telephone line. Each telephone unit contains complete capability for making outside calls, for making extension calls, and for the automatic exchange control of the use of the common telephone line. This telephone system provides functions, including making multiple simultaneous calls on a single telephone line without requiring separate exchange equipment, additional extension or signal lines, or any sacrifice in signal quality. Furthermore, the telephone units in this system can be connected to more than one outside telephone line to expand the system capacity.

27 Claims, 8 Drawing Sheets

○ OPERATION CODE: DEFINE THE TYPE OF OPERATION

○ FIRST OPERAND: DEFINE OUTSIDE LINE 1 OR 2 UPON OUTSIDE CALL AND EXTENSION LINE 1 OR 2 UPON EXTENSION CALL.

○ SECOND OPERAND: DEFINE THE IDENTIFICATION NUMBER OF TELEPHONE UNITS WITH NUMERAL 0-7

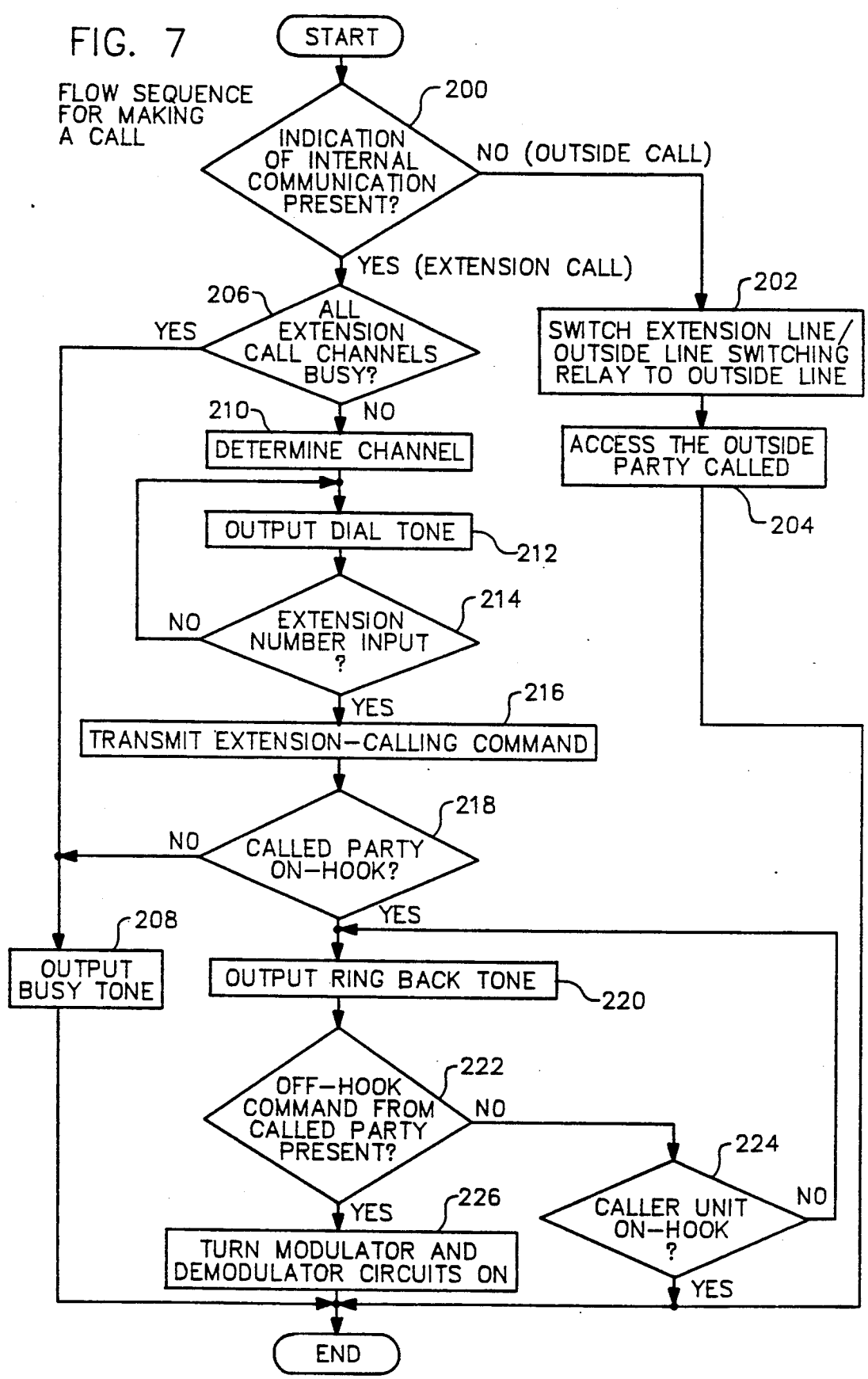

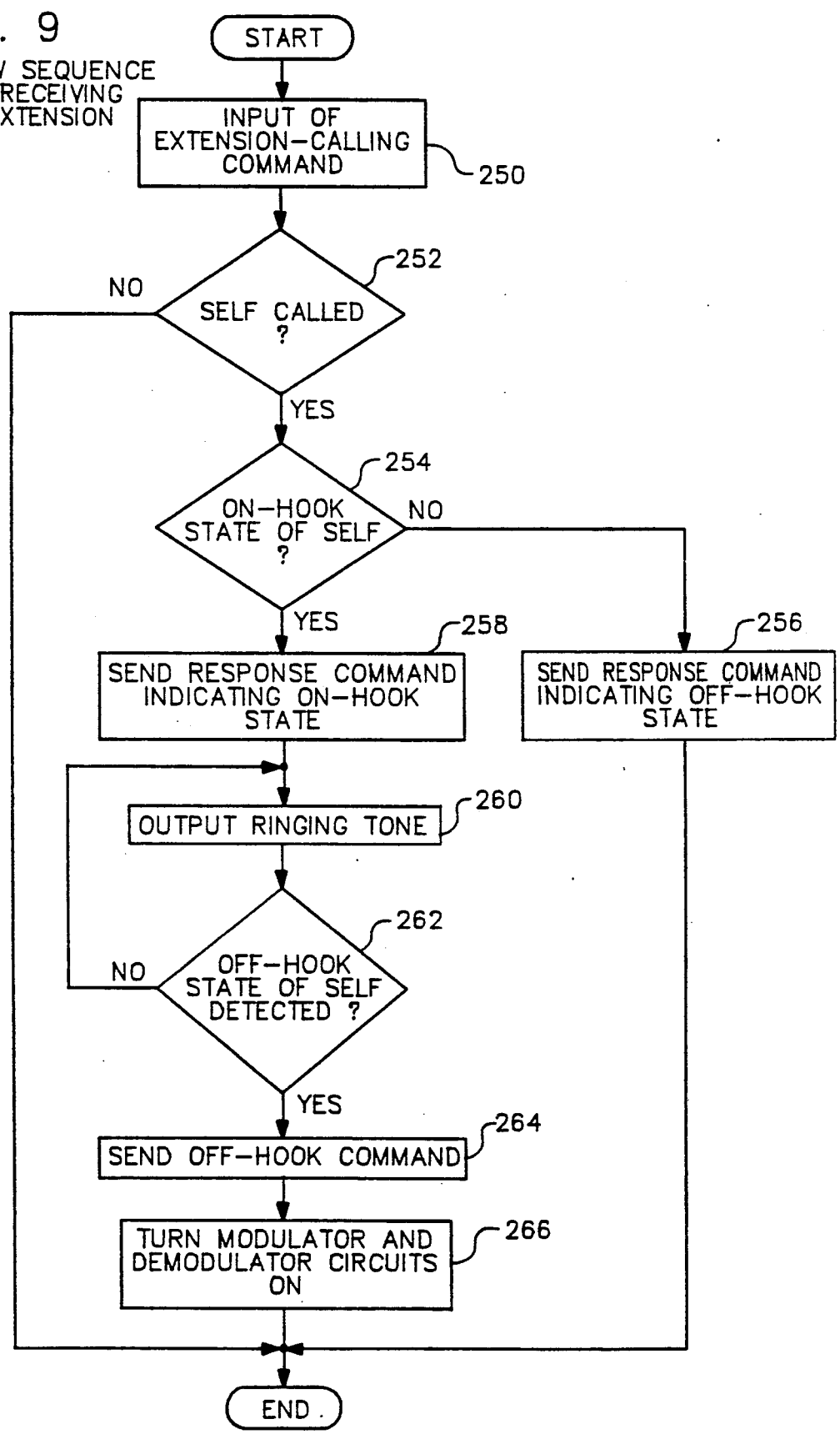

TELEPHONE SYSTEM WITH MULTIPLE EXTENSION TELEPHONES

This is a continuation of application Ser. No. 07/353,601, filed May 18, 1989, now abandoned.

BACKGROUND OF THE INVENTION

1. Field of the Invention

The present invention relates in general to a telephone system and pertains, more particularly, to a telephone system that is adapted to allow outside calls and extension calls to be made through the same telephone line.

2. Background of the Invention

Related art telephone systems adapted to allow both outside calls and extension calls are of two different types, one using an exchange and the other using no exchange. The telephone system of the former type uses, for example, a private branch-exchange (PBX), a small private branch-exchange (small PBX), or a key system unit (KSU) of a key telephone system or the like.

An example of a multi-line telephone system (having two outside lines 1 and 2) using a related art small branch-exchange or key telephone system is shown in FIG. 3. As is shown, an exchange E is provided at the interface between the outside lines (1 and 2) and the extension lines (1 and 2), so that there is no direct connection of the outside lines and the extension lines. A large number of telephone units are commonly connected to the two extension lines 1 and 2. The exchange E functions to electrically separate the extension lines from the outside lines during extension calls.

An example of the telephone system of the type with no exchange is a telephone system which includes a channel used exclusively for extension calls in addition to the telephone lines. Typically, this exclusive extension communication channel is a power line, with inter-extension communication being performed by imposing a signal on the power line.

In all of the above-described related art, telephone systems which are either of the type which uses an exchange or of the type which does not use an exchange, only one communication could take place on a single telephone line at a time. Particularly, an outside call and an extension call could not occur simultaneously on one line. Further, since a sole communication channel is used both for outside and extension calls, it has been necessary, in the system using an exchange, to use the exchange at the interface between the extension line and the outside line so that the extension line is electrically isolated from the outside line during extension calls. Use of this exchange involves installation and wiring work therefore making the telephone system itself very expensive. In this system, furthermore, it has heretofore been impossible to simultaneously make an extension call and an outside call when the same telephone line is used for the making of these calls. Therefore, the number of simultaneous calls is limited by the number of lines.

On the other hand, the system which uses no exchange has had a problem in that a communication channel used exclusively for the extension had to be provided in addition to and separately from the ordinary telephone line. To avoid additional wiring in the typical installation, the existing indoor AC power line is frequently chosen as the means for providing this additional signal line for extension call purposes. A problem with using an existing indoor AC power line as the exclusive extension communication channel was that the quality of sound in communication was degraded due to various sources of noise such as microwave ovens, personal computers, televisions and the like, which are being used increasingly these days.

Accordingly, an object of the present invention is to provide an improved, simple and economical telephone system which enables outside calls and extension calls to take place simultaneously over the same telephone line without the necessity to employ an exchange or to provide additional communication lines.

Another object of the present invention is to provide an improved telephone system of the type disclosed herein which can also be implemented with a multiplicity of lines.

SUMMARY OF THE INVENTION

To accomplish the foregoing and other objects, features and advantages of the invention, the present invention provides an improved telephone system wherein an extension line is directly connected (i.e., without an intervening exchange) to an outside line and extension calls, preferably multiple extension calls, can be implemented simultaneously while an outside call is taking place between the extension line and the outside line during such extension calls.

To accomplish the above-described objects, the telephone system according to the present invention includes a common telephone line connected to an outside line, a plurality of telephone units connected to said common telephone line, an outside call circuit provided in each said telephone units for performing al the standard functions of a basic telephone instrument for use with said outside line. Each of the said telephone units also comprises an extension call circuit and a multiple extension call circuit for determining the composition and transmission level of signals transmitted to said common telephone line from said telephone unit depending upon whether the call is an extension call or an outside call. More particularly, the multiple extension call circuit embodied in this invention produces extension call signals which are higher in frequency than that of the outside calls and lower in level, whereby it enables extension calls and outside calls to take place simultaneously through the common telephone line.

Additionally, the telephone system according to the present invention also comprises an exchange control device provided in each of said telephone units for utilizing information from the phone line condition indicators, operator entered commands and a predetermined control program to control channel assignments and the output of the multiple extension call circuit. Said exchange control device includes logic circuitry, a keypad for operator entry, a predetermined control program and a digitally modulated command channel which is transmitted on the extension call channel simultaneously with extension calls.

BRIEF DESCRIPTION OF THE DRAWINGS

Numerous other objects, features and advantages of the invention should now become apparent upon reading the following detailed description in conjunction with the accompanying drawings, in which:

FIG. 7 is a flow chart showing a flow sequence for making a call;

FIG. 9 is a flow chart showing a flow sequence for receiving a call from an extension line.

DESCRIPTION OF PREFERRED EMBODIMENTS

Figure 1:
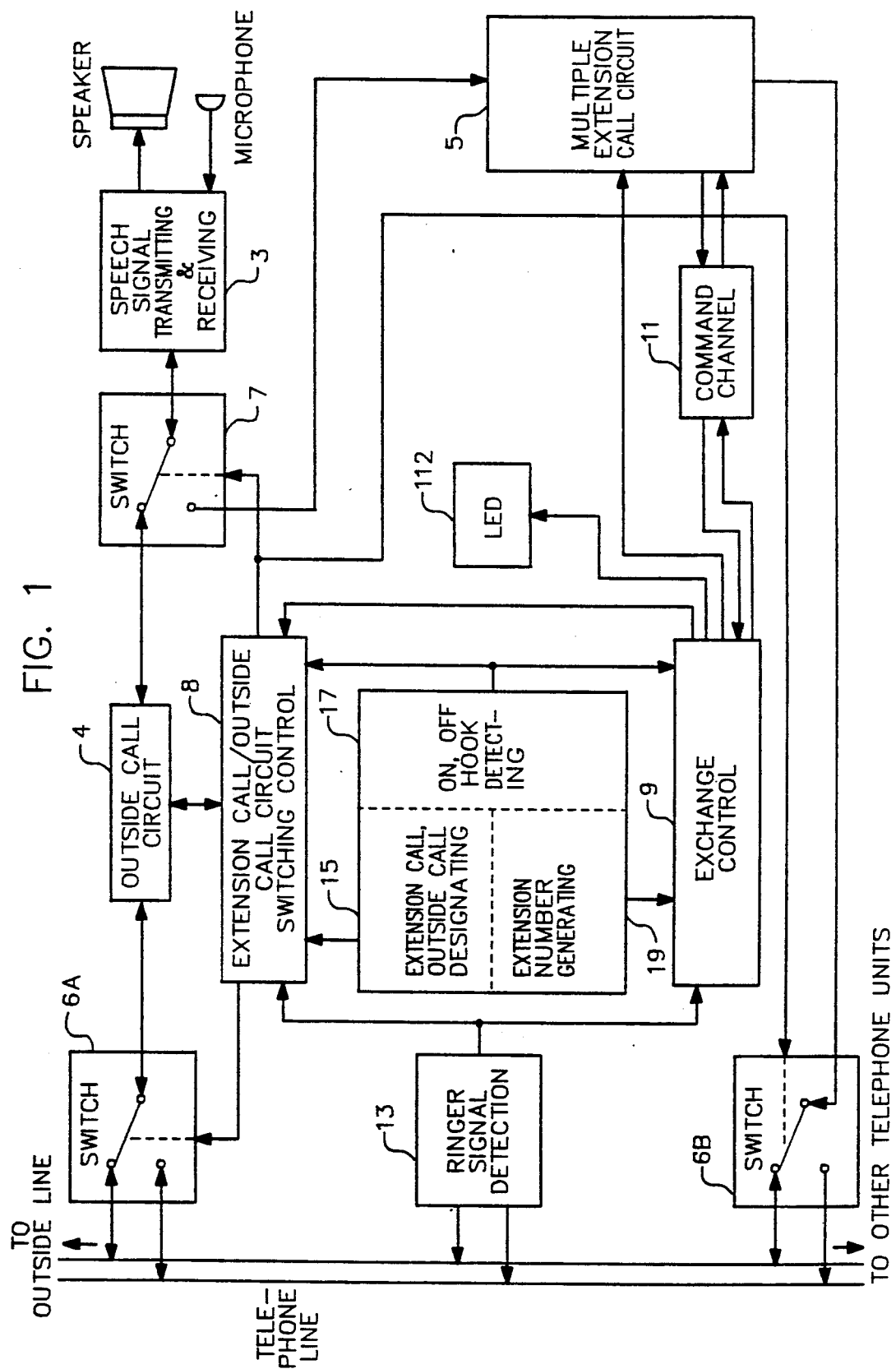
FIG. 1 is a block diagram showing the basic concept of a telephone system according to the present invention.

Reference is now made to the drawings herein, and, in particular, FIGS. 1-9, for further detailed explanation of the present invention. A basic configuration of the telephone system according to the present invention will now be described with reference to FIG. 1, which illustrates the concept of the system. In FIG. 1, only one of a plurality of telephone units connected to the telephone line is shown. It should be understood that the remaining telephone units have a construction identical or similar to the one illustrated. In the telephone system according to the present invention, as shown in FIG. 1, the telephone units are connected to the telephone line which is directly connected to the outside line or central office line, and each of the telephone units includes a device 3 for transmitting and receiving a speech signal, outside call circuit 4 of a type well known in the art which is capable of communicating said speech signal (as a base band signal) in a form suitable for transmission on the outside line, and a multiple extension call circuit 5 which is capable of communicating said speech signal as a carrier current signal. The transmitting/receiving device 3 can be, e.g., a standard telephone handset. More specifically, the base band signal is the original electrical analogue of the acoustic speech signal. The mentioned carrier current signal is a high frequency signal modulated by the base band signal, and superimposed on the telephone line, AC power line, optical fiber network or the like.

The telephone unit further includes switching devices 6A, 6B for selectively connecting the multiple extension call circuit 5 and the outside call circuit 4 to the telephone line, a switching device 7 configurable so that the speech signal transmitting and receiving device 3 is connected to the telephone line through the outside call circuit 4 during an outside call and to the telephone line through the multiple extension call circuit 5 during an extension call, and an extension call/outside call circuit switching control device 8 for applying a switching control signal to the switching devices 6A, 6B.

In order to allow simultaneous extension calls to occur, the multiple extension call circuit 5 includes a plurality of extension call communication channels which are different from the outside call communication channel. The telephone unit also includes an exchange control 9 which is connected to the telephone line through the multiple extension call circuit 5 and a command channel 11. The exchange control 9 controls the extension calls and the outside calls of this telephone system. This is accomplished by utilizing the command channel 11 which is separately implemented on the telephone line from the extension call channels (i.e., on a channel with a carrier frequency different from extension call channel frequencies). Further, at the time of making an extension call, the exchange control 9, together with the command channel means 11, generates a signal which designates one of said plurality of extension call communication channels to be used.

The extension call/outside call circuit switching control device 8 receives, as input, a signal from a ringer signal detecting device 13, a signal from an extension call/outside call designating device 15, a signal from on/off hook detecting device 17, and a signal from the exchange control 9, indicative of whether or not the receiving side of the extension is in a condition in which calls may be accepted.

The exchange control 9 receives as input a signal from the ringer signal detecting device 13, a signal from the on/off hook detecting device 17, and an extension number from extension number generating device 19 at the time of an extension call. As stated earlier, the exchange control 9 also receives exchange control signals from other telephone units, by way of the command channel 11 and the multiple extension call circuit 5. These inputs are used by the exchange control 9 to establish multiple extension calls on one or a plurality of telephone lines simultaneously with outside calls.

It is important to realize that the single line telephone system according to the present invention may be implemented as a multi-line telephone system when two or more outside lines are provided. In this case, two telephone lines are connected to these outside lines, respectively, and all of the plurality of telephone units may be selectably connected to both of the two telephone lines.

Now, with further reference to the drawings, the present invention is described in greater detail with respect to a multi-line telephone system which is an embodiment of the present invention.

Figure 2:
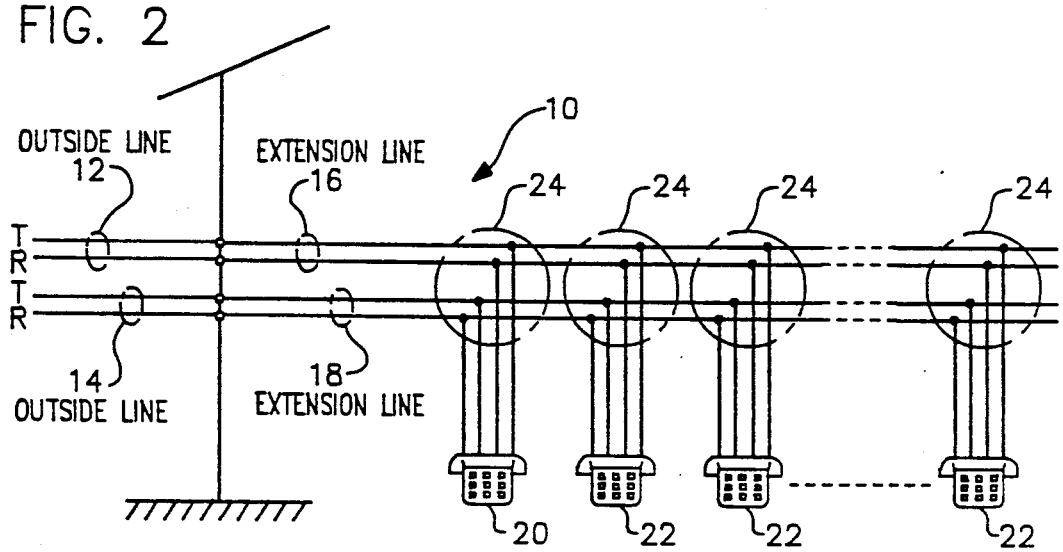
FIG. 2 is a view showing the general configuration of a multi-line telephone system which is an embodiment of the present invention.
Figure 3:
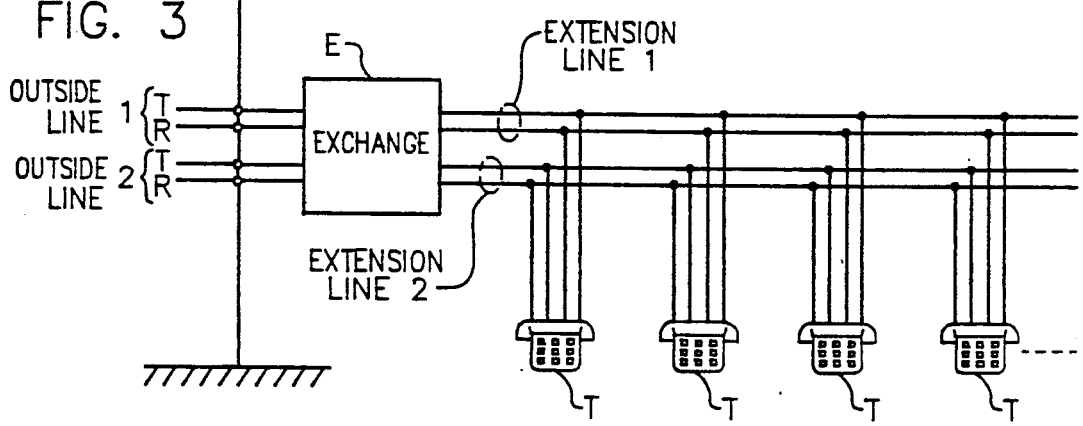
FIG. 3 is a view showing the general configuration of a related art multi-line telephone system using a small private branch-exchange or a key telephone system.

FIG. 2 shows the general configuration of the multi-line telephone system 10 which has two outside lines 12 and 14 to which indoor extension lines 16 and 18, respectively, are directly connected (i.e., without an intervening exchange). Connected to both of these extension lines 16 and 18 through phone jacks 24, or any such conventionally well known means, are, for example, a master telephone unit 20 and, e.g., seven slave telephone units 22. In this embodiment, therefore, eight telephone units in total are directly connected to the outside lines without the intervention of conventional exchanges.

Figure 4:
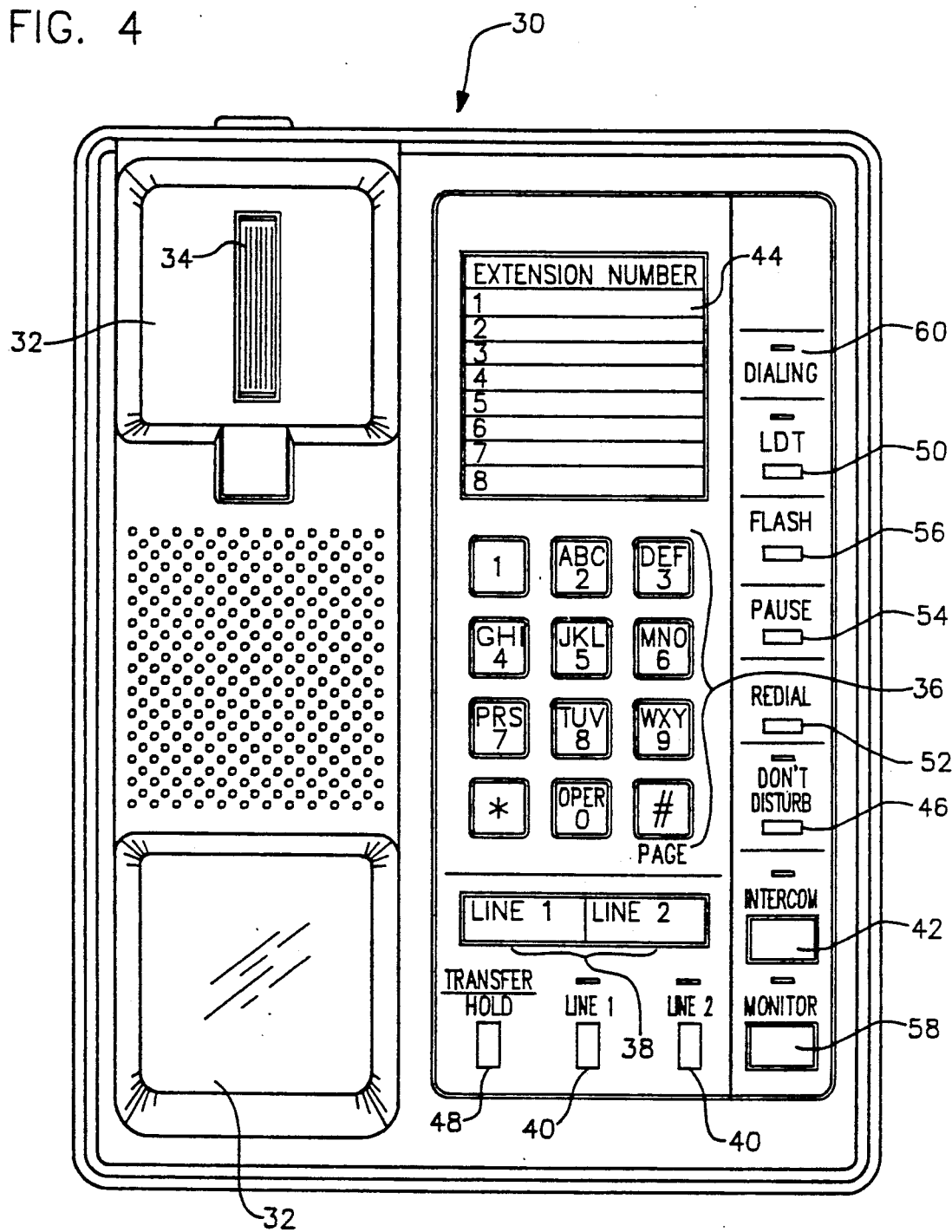
FIG. 4 is a top view showing the appearance of a telephone unit for use in the telephone system of FIG. 2.

FIG. 4 shows a preferred appearance of a body 30 of the telephone unit 20 with the handset removed therefrom. The slave telephone units 22 have the same appearance as the telephone unit 20. The body 30 comprises a handset rest 32, a hook switch 34, telephone keys 36, an outside line label 38, outside line selector buttons 40, an internal communication intercom key 42, an extension number list 44, and internal communication accept inhibit (Don't Disturb) key 46, a hold key 48, and a dial pulse output/DMTF (tone) output selector key 50. In addition to these components, the body 30 may include a redial key 52, a pause key 54, a flash key 56, a monitor key 58, and a dialing indicator 60.

Figure 5:
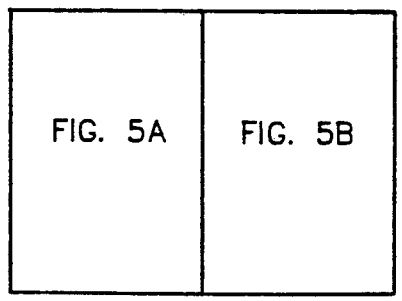
FIG. 5 shows the arrangement of FIGS. 5A and 5B.
Figure 5A:
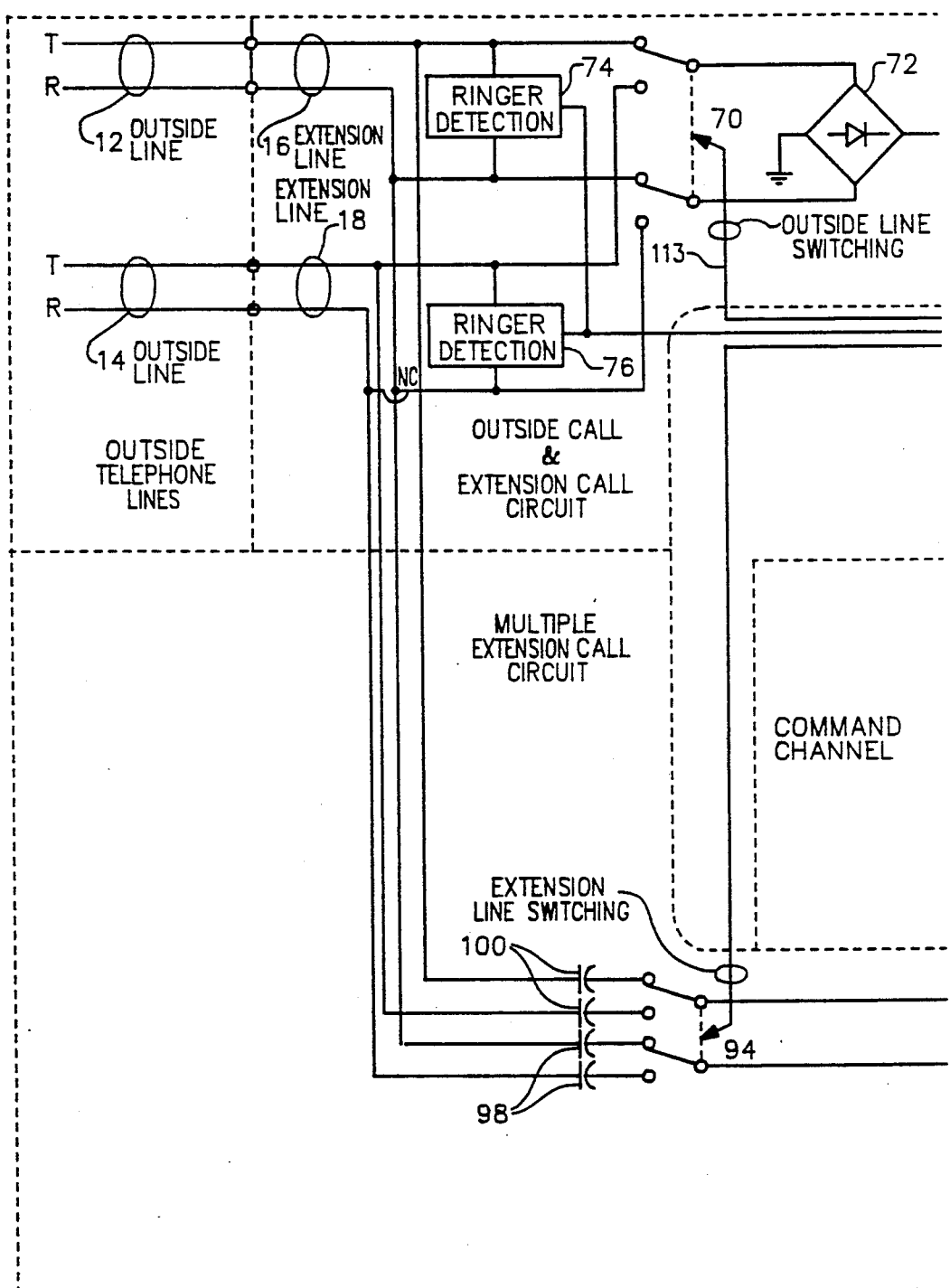
FIGS. 5A and 5B form a circuit/block diagram of a master telephone unit.
Figure 5B:
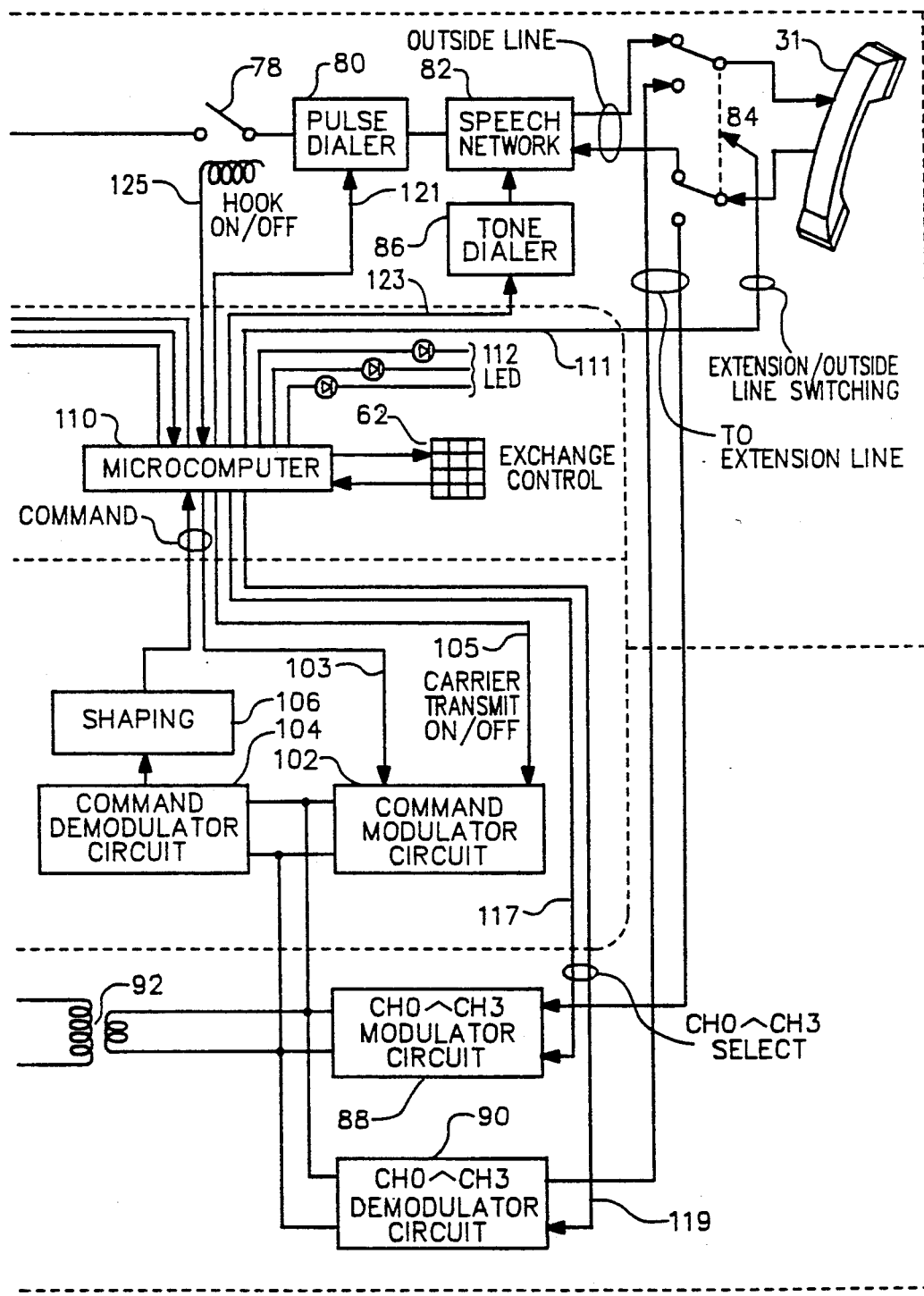

The circuit of the telephone unit 20 will now be described with reference to FIG. 5.

The circuit of the telephone unit 20 includes a bridge circuit 72 connected through an outside line switching relay 70 to each of the telephone extension lines 16 and 18, respectively. The bridge circuit serves to provide proper polarity, as required by the tone dialer 86. These extension lines 16 and 18 are in turn connected to outside telephone lines 12 and 14 respectively. These connections allow for the detection of ringer signals by conventional ringer detection circuitry 74 and 76, respectively.

The output of the bridge circuit 72 is connected to a speech network 82 through a mechanically or electrically operated hook switch 78 and a pulse dialer 80. The speech network 82 is connected to a handset 31 through an extension line/outside line switching relay 84. Connected to the speech network 82 is the output of a tone dialer 86. The extension call/outside call circuit 8 described above substantially comprises a tone dialer 86, speech network 82, a pulse dialer 80, a hook switch 78, and bridge circuit 72.

The handset 31 is connectable to the input of a channel FM modulator circuit 88 and the output of a channel FM demodulator circuit 90 through the extension line/outside line switching relay 84. The FM modulator circuit 88 and FM demodulation circuit 90 act to modulate and demodulate the carrier signals (used in extension communication) with analog signals from/to the handset 31. The FM modulator circuit 88 and the FM demodulator circuit 90 in the illustrated embodiment have four switchable carrier frequencies in the band of 280–400 KHz, and thus they have four communication channels CHO–CH3. Also, in this particular embodiment, the carrier frequency of each of these channels is selected to be 280 KHz for CHO, 320 KHz for CH1, 360 KBz for CH2, and 400 KHz for CH3, respectively. They constitute the plurality of extension call communication channels mentioned above.

Other conceivable embodiments could provide as many or more channels operating on the same or other frequencies without departing from the spirit and scope of the invention. Furthermore, other embodiments may utilize means of modulating said frequencies other than those described.

The output of the modulator circuit 88 and the input of the demodulator circuit 90 are connected to each of the telephone lines through a transformer 92 and an extension line switching relay 94. Capacitors 98 and 100 are connected between the extension line switching relay and each of the telephone lines for the purpose of isolating multiple extension call circuit signals of frequencies lower than the used carrier frequencies. In the preferred embodiment, the multiple extension call circuit 5, described above, substantially comprises the channel modulator circuit 88, channel demodulator circuit 90, and transformer 92, and an extension line/outside line switching device 8 controls the extension line/outside line switching relay 84, outside line switching relay 70 and extension line switching relay 94.

Connected to the transformer 92 is the output of an automatic exchange control comprising a command modulator circuit 102, a command demodulator circuit 104, a wave shaping circuit 106, a microcomputer 110, an array of LED indicators 112 and telephone keys 62. In the present embodiment the command modulator circuit 102 and demodulator circuit 104 operate on a carrier frequency of 430+2 KHz, which is different from the four carrier frequencies mentioned above. The input of the command modulator circuit 102 is connected to receive commands over line 103 and a carrier transmission on/off signal over line 105 from the microcomputer 110. The command modulator circuit 102 transforms the received command into an audio frequency signal and causes said audio frequency command signal to FM-modulate the command carrier frequency and transmit it during the period in which the carrier wave transmission is on. Other conceivable embodiments of the command signal could comprise any of several modulation means or carrier frequencies. The output of command demodulator circuit 104 is connected so as to provide commands originating from other telephone units connected in the telephone system comprising the present invention to the microcomputer 110 through wave form shaping circuit 106. The wave form shaping circuit 106 prevents outputs from the command demodulator circuit 104 which may result from noise disturbances reaching the system through the outside lines or 18 from causing a false command input to the microcomputer 110. A number of devices can be used as said wave form shaping circuit, including a bandpass filter and a low-pass filter. The characteristics of the wave form shaping circuit will depend on the types of signals used as input to the microcomputer, as is well known in the art.

The microcomputer 110 may be a 4-bit microcomputer. It is preferably a type NEC PD75106G in this embodiment, although other logical signal processing means, including but not limited to discrete components, could be employed to provide the automatic exchange control contemplated by the present invention. The microcomputer 110, which includes associated memory for storing programmed instructions and call status information, etc., receives, as input information, a key output from keys 62 (schematically shown to represent the various keys of FIG. 5), ringer detection signals from the ringer detecting circuits 74 and 76, and commands from the command demodulator circuit 104 through the waveform shaping circuit 106. The keys 62 include the extension call/outside call designating device 15, extension number generating device 19, and the on/off hook detecting device 17, mentioned above.

The microcomputer 110 outputs, as control signals, an extension line/outside line switching signal to the relay 84 over line 111, an outside line switching signal to the relay 70 over line 113, and an extension line switching signal to switch the relay 94 using line 115. Further, the microcomputer 110 outputs CHO-CH3 selecting signals over lines 117, 119 to the channel modulator circuit 88 and demodulator circuit 90 and various commands to the command modulator circuit 102 over line 103 for the automatic exchange control. Additionally, the microcomputer 110 outputs signals to light-emitting diodes (LED) 112 for various display indications and also outputs dialer control signals to the pulse dialer 80 and the tone dialer 86 for transmission of the dialing signal over lines 121, 123, respectively.

Transmission levels of the channel modulator circuit 88 and the command modulator circuit 102 will now be described. According to the Technical Standard based on the provisions of the Public Telecommunication Law of Japan, when the transmission signal level in the normal frequency band up to 4 KHz is defined as P decibels above 1 milliwatt (dBm), other transmission levels above this frequency band are prescribed in relation to P dBm. In the frequency band 280 KHz to 432 KHz mentioned above, the other transmission level is prescribed to be P −60 dB or lower. Likewise, in the United States of America, Part 68 of the Rules of the Federal Communications Commission provides "the effective value (rms) of the line voltage component in the frequency range 270 KHz to 8 MHz, as averaged over 2 s, must not exceed $-15$ dBV" (decibels above 1 volt). Accordingly, the output level range of each of the modulator circuits 88 and 102 is adjusted to comply with these requirements for transmission levels.

Figure 6:
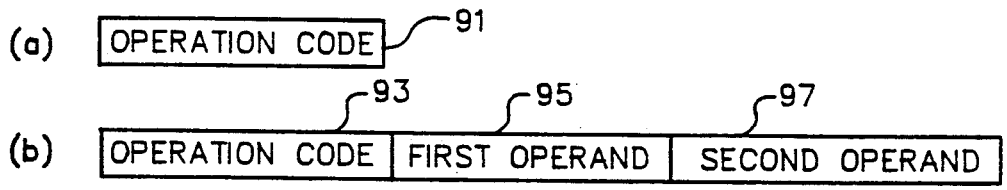
FIG. 6 illustrates command formats.

Commands will now be described with reference to FIG. 6. Control information which is used for exchange control between a plurality of telephone units 20 to 22 is transmitted between these telephone units in the form of commands. These commands are classified in two types, that is, a first type of command, as shown in FIG. 6(a), comprising an operation code 91 only, and a second type of command, as shown in FIG. 6(b), comprising an operation code 93, a first operand 95, and a second operand 97.

An example of the first type of command is a ringer command. When a ringer signal arriving from an outside line is detected, such a ringer command is transmitted from a master telephone unit to all of the slave telephone units 22 to notify them of the presence of the call from the outside line.

Examples of the second type of command are an off-hook command, an extension-calling command, a hold command, a transfer command, and the like.

Such off-hook commands are generated when a receiver is taken off the hook in response to a call from the outside or an extension line or when connection of the line to the outside or to an extension line is to be signaled to the other telephone units. The operation code 93 has a code indicating the off-hook state. The first operand includes the number of the outside line (preferably numeral 1 or 2, indicating one of the two outside lines which is selected, e.g., by the outside line selector buttons 40 shown in FIG. 4) or the number of the extension line (preferably numeral 1 or 2). Whether the second operand 95 refers to an outside line or an extension line is determined by the operation code 93. The second operand 97 includes the identification number of any telephone unit from which the handset has been taken off-hook. Preferably, the identification number is one of the numerals 0–7 assigned to eight telephone units in all. As described above, all codes and operands are translated to or from an audio frequency by the command modulator/demodulator 102, 104 according to a predetermined code. The audio frequencies modulate the command carrier frequency 432 kHz.

The extension-calling command has an operation code indicative of the extension call and is generated by the caller when the internal communication key 42 is depressed to begin an extension call. In that case, the first operand contains the number (preferably numeral 1 or 2) indicating which of the two extension lines and which of the transmission (modulating) channel number (preferably numeral 0 through 3 indicating CH0-CH3) is to be used; and the second operand contains the extension number (preferably numeral 0 through 7) of the party being called. The extension line can be selected according to data input by the user from the keypad 62, or the extension line and/or the transmission channel can be selected by the microprocessor 110 according to a pre-stored program. A number of selection algorithms can be used. One such selection algorithm involves selecting the first non-busy line or channel in an ordered list (stored in memory) of line and channel numbers. Several methods can be used for ascertaining whether a line or channel is busy, including scanning the lines or channels for a busy signal or storing the busy/non-busy status of lines and channels in a table. The extension number of the party being called is derived from the data input through the keyboard 62.

The called-extension response command is generated by the called party in response to the extension-calling command, and its operation code has a code indicating whether the call is acceptable or not. Its first operand contains the number of the extension line and the number of the reception (demodulating) channel; and its second operand contains the extension number of the party called who responds to the call. The reception channel is selected by the microprocessor in the called-extension telephone in a manner similar to that described above in connection with selection of the transmission channel.

The hold command is generated by a telephone unit in which the hold key 48 is depressed during communication and is used, for example, during internal transfer of a telephone call. The operation code of the hold command has a code indicative of the hold state; its first operand contains the number of the extension line presently being used and the second operand contains the extension number of the telephone unit being placed in the hold state.

Following the operation of the hold key, the transfer command is then generated as a result of the transferor's receiver being on the hook after the extension number of the transferee has been entered using the keys 36 (see FIG. 4) and communication with the transferee has been established. Its operation code has a code indicating whether the transfer relates to an extension call or to an outside call. The first operand of the transfer operation code contains the number of the extension line; the second operand contains either the extension number of the transferor when transferring an extension call or the number of the outside line of the call to be transferred when transferring an outside call.

In addition to the transfer command described above, a dial switch command is provided which operates during an extension call to transfer the call from the currently used extension line to the other by means of the extension line switching relay 94. This dial switch command may be generated when an extension call is being conducted via a pair of telephone units and if an outside call is started via another telephone unit through the same extension line being used by that pair of units. For example, the dial switch command could be used when dialing pulses could interfere with the speech signal since the signal level of dialing pulses is very high in comparison to a low level modulated RF carrier which is conveying the extension call already in progress. Such a command, by diverting the dialing signals to another line simplifies the means necessary to provide adequate isolation between said dialing signals and extension calls in progress.

Figure 8:
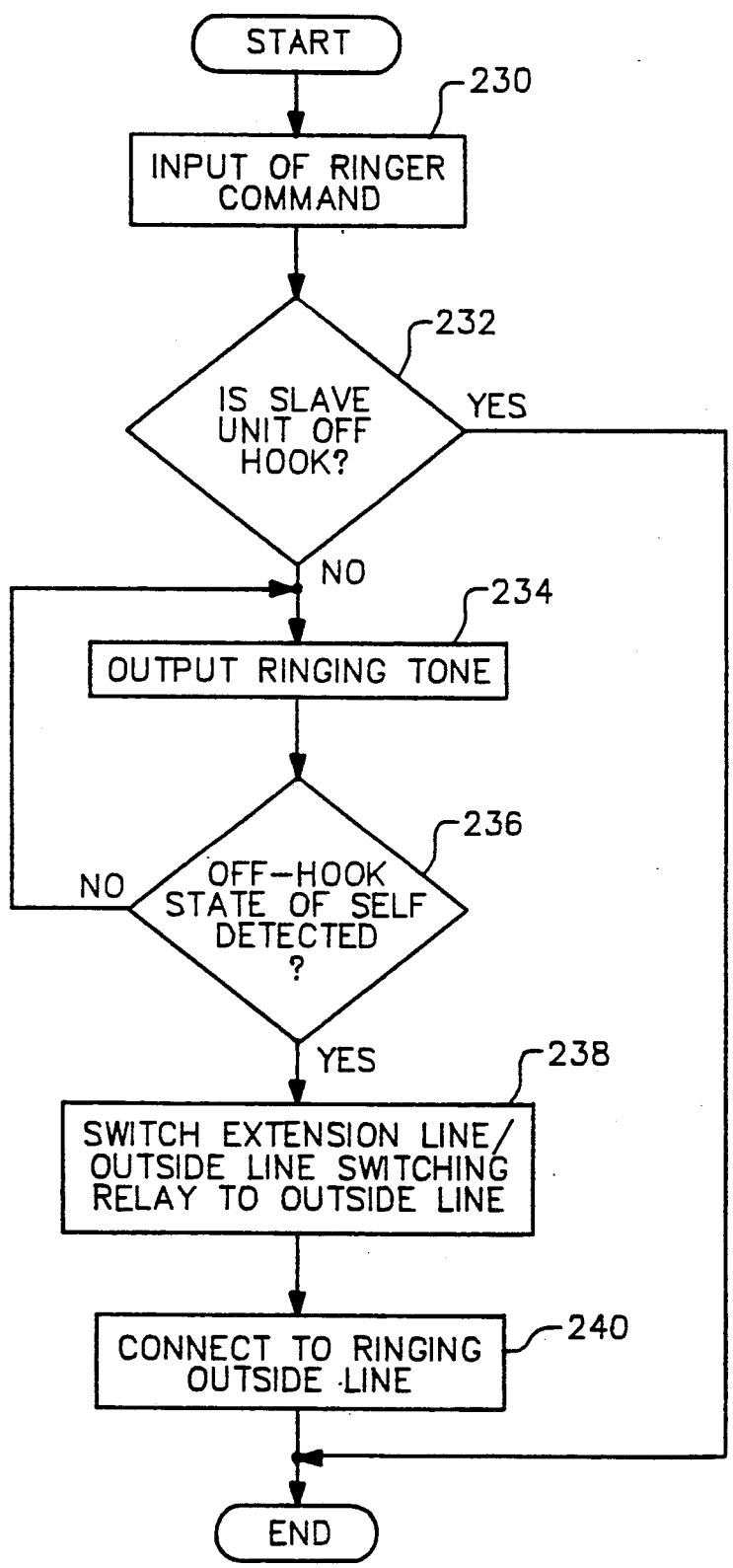
FIG. 8 is a flow chart showing a flow sequence for receiving a call from an outside line.

Operation of the telephone system according to the present invention will now be described with reference to the flow charts of FIGS. 7, 8 and 9.

FIG. 7 is a flow chart showing a sequence for the case in which each of the telephone units makes a call. First, in Step 200, the presence of an indication of internal communication is checked by detecting whether the intercom Key 42 see FIG. 4) has been depressed or not. In case of NO, the extension line/outside line switching relay 84 (see FIG. 5) is switched to the outside line in Step 202, and the outside line switching relay 70 (see FIG. 5) is switched to an idle line if necessary. In the next step 204, accessing of the party called is made by dialing, and thereafter this routine ends.

Returning now to Step 200, in case of YES, Step 206 follows where a check is made to determine whether or not all extension channels are busy.

In case of NO, indicating an extension call channel is available for use, then an extension call channel to be used, for example CH0, is selected in the next step 210. In step 212, the microcomputer outputs a signal for the generation of a dial tone, using, e.g., a tone generator (not shown), to indicate that it is in the state of allowing an extension call to be dialed. Next, a check is made at step 214 to determine whether or not the extension number has been entered at Key 62 (see FIG. 5). In the case of NO, the sequence loops to the Step 212. In case of YES, the sequence proceeds to step 216, in which an extension-calling command is transmitted. This command includes the number of the extension line and the number of the selected transmission modulating channel in the present example, CH0) in the first operand, and the extension number of the party being called (for example, in case of a call being made from the telephone unit 2 to the telephone unit 4, the extension number is 4) in the second operand. This command is transmitted to all of the telephone units.

Then, in Step 218, it is determined whether the telephone of the party being called is in the on-hook state or not by checking the called-extension-response command which is received from the party called. This coded response command, which is transmitted to all telephone units, indicates whether the called telephone is in the on-hook or off-hook state (in the operation code), the number of the extension line (in the first operand), and the extension number of the party called (for example, 4) in the second operand). By checking the operation code and the second operand, it can be ascertained whether the party being called has its telephone receiver on the hook or not. In the case of NO, the called extension is busy; therefore the sequence proceeds to Step 208 and this loop ends. In the case of YES, then in Step 220 the microcomputer outputs a signal to generate a ring back tone to notify the caller that the call has been placed.

In the next Step 222, presence of an off-hook command from the called party is checked. In case of NO, the sequence proceeds to Step 224, in which it is checked whether the caller replaced his receiver or not. This is determined from the status of switch 78, transmitted over line 125 (FIG. 5). In case of NO, the sequence is looped to the Step 220. In case of YES, this routine ends because the call was thereby terminated. In the Step 222, in case of YES, that is in case of receipt of an off-hook command, the sequence proceeds to the next Step 226. This off-hook command is described below in connection with FIG. 9, reference number 264, and includes the number of the extension line. The channel (for example, CH1 on which the called party will be transmitting (and on which, consequently, the calling party will be receiving or demodulating) is indicated in the first operand, and the extension number of the called party (for example, 4) is indicated in the second operand. In Step 226, a CH0 selection signal (in the present example) is applied to the modulator circuit 88 (see FIG. 5) and, in the described example, a CH1 selection signal is applied to the demodulator circuit 90 (see FIG. 5), thus activating these circuits. This establishes the extension call circuit until either party places the handset on-hook and then this routine ends.

Next, sequences for the cases of receiving a call will be described with reference to FIGS. 8 and 9. The way in which an outside call is placed to the master telephone unit 20 (see FIG. 2) is the same as in the case of a conventional telephone unit and thus will not be described.

A call arriving from the outside line to the slave telephone unit 22 (see FIG. 2) will be described with reference to FIG. 8. In the first step 230, there is an input of a ringer command, that is, a call signal, to the slave telephone unit. In case of a call from the outside line, the call signal to the master telephone unit 20 is a ringer detection signal, but in the slave telephone unit 22 the call signal is a ringer command from the master telephone unit after the master telephone has detected the ringer signal.

In the next step 232, it is determined whether the slave telephone unit called is in the off-hook state or not. In case of YES, the line is busy and thus this routine ends. In case of NO, the sequence proceeds to Step 234 in which the microcomputer outputs a signal to generate a ringing tone and continues it until the off-hook state of the slave telephone unit called is detected in the next step 236. When the off-hook state is detected in the step 236, the extension line/outside line switching relay 84 (FIG. 5) is switched to the outside line in Step 238. Then, in Step 240, the outside line switching relay 70 (FIG. 5) is switched to the side which is ringing, and then this routine ends.

Next, description will be made of receiving a call from an extension line with reference to the flow chart of FIG. 9. In the first Step 250, there is an input of an extension-calling command. This is the command which was transmitted in the Step 216 of FIG 7. In the next Step 252, the extension number (for example, 4) of the called party contained in the second operand of the command is checked to determine whether the slave telephone unit called is other than the unit originating the call. In the case of NO, this routine ends. In case of YES, it is determined in the next step 254 when the called unit is on the hook or not. In case of NO, that is, the called unit is off the hook, a called-extension-response command which has the operation code indicating the off-hook state is transmitted in Step 256, and then this routine ends. On the other hand, in case of YES, a called-extension-response command which has the operation code indicating the on-hook state is transmitted in Step 258. Then, in Step 260, a signal is output to generate a ringing tone, and this is continued until it is detected that the called telephone unit has been taken off the hook in Step 262. When the off-hook state is detected, an off-hook command is transmitted in Step 264. This command is the same command to be checked in Step 222 of FIG. 7. In the next Step 266, as before in Step 226 of FIG. 7, the modulator circuit 88 (at, e.g., CH0) and the demodulator circuit 90 (at, e.g., CH1) are activated by the selection signal from the microcomputer until either party places the handset on-hook. Then this routine ends.

While the present invention has been described with respect to a multi-line telephone system which is an embodiment of the invention, it may be modified as described below. While the above embodiment has been described as having the ringer only in the master telephone unit for the purpose of keeping costs low, it may alternatively be provided in the slave telephone units as occasion demands. In that case, the routine of FIG. 8 is unnecessary. Further, in the present invention, the modulation of extension channels can be performed not only with a frequency modulation techniques but also with an amplitude modulation technique or phase modulation technique. And yet further, the modulation means used to encode the command channel may be accomplished using a variety of digital modulation schemes including, but not limited to, frequency shift keying (FSK), phase shift keying (PCM), etc.

In the telephone system according to the present invention described hereinabove, the use of different signal levels enables an outside call or an extension call to be conducted from any telephone within the system connected to a common telephone line. Also by utilizing signal levels of an extension call channel different from those of the outside call channel and by suitable choice of modulating means an outside call and an extension call are allowed to take place on a common telephone line simultaneously. Further, the multiplexing of the extension call channels enables a plurality of extension calls to take place on a common telephone line simultaneously, limited only by the number of carrier channels provided.

According to the present invention, as described above, outside call communication and extension call communication using the same telephone line can be performed without using any exchange and yet without sacrificing sound quality.

Although the present invention has been described by way of a preferred embodiment, modifications and variations of the invention will be apparent to those skilled in the art, the scope of the claimed invention being described by the following claims.

What is claimed is:

1. A method for communicating between a plurality of telephones over an extension line connected to an outside telephone line, each of the telephones having a selectable-frequency modulator and demodulator, each of the telephones having an on-hook state and an off-hook state, the method comprising:
   detecting a signal on said extension line;
   determining whether internal communication is present;
   selecting a carrier frequency for transmission receiving an indication of a called extension unit;
   sending, from a first telephone, a first signal indicating an extension call, indicating a first carrier frequency for transmission by said first telephone, and indicating the called extension unit;
   receiving, at a second telephone, said first signal;
   transmitting, from said second telephone, following said step of sending, a second signal indicating an on-hook condition of said second telephone;
   transmitting, from said second telephone, a third signal, after entering an off-hook state, indicating said off-hook state and indicating a second carrier frequency for transmission by said second telephone;
   selecting, at said second telephone, said first frequency for demodulation and said second frequency for modulation; and
   selecting, at said first telephone, said second frequency for demodulation and said first frequency for modulation.

2. A method, as claimed in claim 1, further comprising connecting said first telephone for communication with said outside line when said step of determining indicates that internal communication is not present.

3. A method, as claimed in claim 1, further comprising:
   determining whether said second telephone is in an off-hook state after said step of sending said first signal; and
   providing a busy tone at said first telephone when said second telephone is in an off-hook state after said step of sending a first signal.

4. A method, as claimed in claim 1, further comprising providing a ring back tone at said first telephone while said second telephone is in said on-hook state.

5. A telephone extension system for connection to an outside telephone line comprising:
   at least first and second telephones;
   at least a first telephone extension line directly connected to said outside line and extending between at least said first and second telephones;
   means for connecting said first telephone to said extension line to establish a first communication at a first average signal level using said outside line; and
   means for connecting said second telephone to said first extension line to permit a second communication, said second communication occurring without using said outside telephone line,
   means for limiting said second communication to a maximum average signal level less than said first average signal level to permit said second communication to occur simultaneously with said first communication substantially without interference with said first communication.

6. A telephone extension system, as claimed in claim 5, further comprising:
   a second telephone extension line directly connected to said outside line and extending between at least said first and second telephones; and
   means for switching said second telephone to said second extension line when an outside call is started through said first extension line.

7. A telephone extension system for connection to an outside line as claimed in claim 5, wherein:
   said first telephone is a master telephone and said second telephone is a slave telephone, said first master telephone and second slave telephone each including a ringer detector and further comprising:
   means in said first master telephone for detecting a ringer signal from said outside line, wherein said means is also the ringer detector for said first master telephone; and
   means in said first master telephone for transmitting a ringer command to said second slave telephone, after said first master telephone has detected a ringer signal.

8. A telephone extension system as claimed in claim 5, further comprising a handset for receiving and broadcasting sound and wherein said means for limiting said second communication comprises:
   a carrier modulator/demodulator circuit for modulating a selectable-frequency transmission carrier with a signal from said handset and for demodulating a selectable-frequency reception carrier to provide a signal to said handset; and
   a command signal modulator for receiving a command signal and modulating a carrier signal in response to said command signal;
   said carrier modulator/demodulator circuit and said command signal modulator configured to provide a signal with a maximum average signal level.

9. A telephone extension system as claimed in claim 8, further comprising a speech network for transmitting and receiving signals to and from said handset and for transmitting and receiving outside line signals, wherein said means for connecting comprises:
- a controllable switch for selectably connecting said handset to one of said speech network and said modulator/demodulator circuit;
- a plurality of keys for entering operational commands and data;
- a command signal demodulator for receiving a remote command signal on said extension line and demodulating said remote command signal to provide a remote command; and
- a processor for
  - receiving said input commands and data;
  - controlling said means for selectably connecting said handset;
  - selecting a frequency for said selectable-frequency transmission carrier;
  - selecting a frequency for said selectable-frequency reception carrier;
  - receiving a remote command from said command signal demodulator;

receiving a hook status signal; and issuing a command signal to said command signal modulator in response to at least one of said input commands, said remote command, and said hook status signal, said command signal indicating both a first carrier frequency and a called extension unit.

10. A telephone extension system comprising:
- at least a first telephone extension line operably connected to said outside line;
- a plurality of telephones operably connected to said first extension line;
- means, in each of said telephones, for selectable connection to said first extension line to establish a first communication at a first average signal level using said outside telephone line; and
- multiple extension call means, in each of said telephones, for establishing and executing multiple extension calls over said first telephone extension line concurrently with said first communication said multiple extension calls occurring at a maximum average signal level less than said first average signal level.

11. A telephone extension system as claimed in claim 10, wherein said multiple extension call means includes a plurality of carrier current circuit means for providing signals suitable for transmission over said extension line and interconnection means for connecting and disconnecting said multiple extension call means.

12. A telephone extension system as claimed in claim 11, wherein said carrier current circuit means includes FM modulation means and FM demodulation means, and further comprising transformer coupling and relay switching means for providing said interconnection of said multiple extension calls with said telephones.

13. A telephone extension system as claimed in claim 10, further comprising exchange control means provided in each of said plurality of telephones connected to said multiple extension call means usable for controlling connection and disconnection of said multiple extension calls.

14. A telephone extension system as claimed in claim 13, wherein said exchange control means includes a microprocessor.

15. A telephone extension system as claimed in claim 13, further comprising operator key means connected to said exchange control means for entering operational commands.

16. A telephone extension system as claimed in claim 10, further comprising command channel means connected to said multiple extension call means usable for conveying extension call control signals and status information signals between each of said plurality of telephone.

17. A telephone extension system as claimed in claim 16, further comprising means for encoding control information to be transmitted on said command channel.

18. A telephone extension system, as claimed in claim 17, further comprising means for encoding extension call addresses for use in establishing extension call connections.

19. A telephone extension system as claimed in claim 16, wherein said command channel means includes means for encoding and decoding said control and information signals.

20. A telephone extension system, as claimed in claim 19, further comprising wave shaping means for filtering the output of said means for decoding.

21. A telephone extension system, as claimed in claim 10, further comprising indicating means connected to said exchange control means for signaling the operational status of the telephone system.

22. A telephone extension system, as claimed in claim 10, further comprising:
- a second telephone extension line; and
- means for selectably connecting said plurality of telephones to said second extension line.

23. A telephone extension system, as claimed in claim 22, further comprising means, in each of said telephones, for selecting said first telephone extension line or said second telephone extension line for connection of said telephone using said means for connection to said first extension line, and said means for connection to said second extension line.

24. A telephone extension system for connection to an outside telephone line comprising:
- at least first and second telephone extension lines;
- first means for connecting each of said first and second telephone extension lines to at least one outside telephone line;
- a plurality of telephones, each operably connectable to said first and second telephone extension lines, each of said plurality of telephones having speech signal transmitting and receiving means;
- second means for transmitting and receiving outside call signals on one of said first and second extension lines for selectably providing communication over said outside line;
- third means for transmitting and receiving, on one of said first and second extension lines, a first carrier signal at a selectable frequency, said carrier signal modulatable with a second signal;
- fourth means for selectably connecting said speech signal transmitting and receiving means to one of said means for transmitting and receiving outside call signals and said means for transmitting and receiving a carrier signal;
- fifth means for selecting a frequency for said carrier signal;
- sixth means for selecting said first or said second telephone extension line for said transmission and reception of a carrier signal;

seventh means for selecting said first or second extension line for said transmitting and receiving of outside call signals; and eighth means for modulating a second carrier signal with a command signal.

25. A telephone extension system, as claimed in claim 24, wherein said fifth, sixth, and seventh means comprise a microprocessor.

26. A telephone extension system, as claimed in claim 25, further comprising key means operably connected to said microprocessor for entering commands.

27. A telephone for connection to a telephone extension line comprising:
  a handset for receiving and broadcasting sound;
  a speech network for transmitting and receiving signals to and from said handset and for transmitting and receiving outside line signals;
  carrier modulator/demodulator circuit for modulating a selectable-frequency transmission carrier with a signal from said handset and for demodulating a selectable-frequency reception carrier to provide a signal to said handset;
  a controllable switch for selectably connecting said handset to one of said speech network and said modulator/demodulator circuit;
  a plurality of keys for entering operational commands and data;
  a command signal demodulator for receiving a remote command signal on said extension line and demodulating said remote command signal to provide a remote command;
  a command signal modulator for receiving a command signal and modulating a carrier signal in response to said command signal; and
  a processor for
    a) receiving said input commands and data;
    b) controlling said means for selectably connecting said handset;
    c) selecting a frequency for said selectable-frequency transmission carrier;
    d) selecting a frequency for said selectable-frequency reception carrier;
    e) receiving a remote command from said command signal demodulator;
    f) receiving a hook status signal; and
    g) issuing a command signal to said command signal modulator in response to at least one of said input commands, said remote command, and said hook status signal, said command signal indicating both a first carrier frequency and a called extension unit.

* * * * *